US010370528B2

(12) United States Patent
Nakada et al.

(10) Patent No.: US 10,370,528 B2
(45) Date of Patent: Aug. 6, 2019

(54) ACRYLIC BLOCK COPOLYMER AND ADHESIVE COMPOSITION

(71) Applicant: KURARAY CO., LTD., Kurashiki-shi (JP)

(72) Inventors: Kanayo Nakada, Tsukuba (JP); Yoshihiro Morishita, Tsukuba (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 15/546,198

(22) PCT Filed: Jan. 21, 2016

(86) PCT No.: PCT/JP2016/051641
§ 371 (c)(1),
(2) Date: Jul. 25, 2017

(87) PCT Pub. No.: WO2016/121607
PCT Pub. Date: Aug. 4, 2016

(65) Prior Publication Data
US 2018/0016431 A1 Jan. 18, 2018

(30) Foreign Application Priority Data

Jan. 27, 2015 (JP) .................. 2015-013141

(51) Int. Cl.
| C08L 53/00 | (2006.01) |
| C09J 133/08 | (2006.01) |
| C09J 133/10 | (2006.01) |
| C09J 153/00 | (2006.01) |
| C08L 33/08 | (2006.01) |
| C08L 33/10 | (2006.01) |
| C08F 297/02 | (2006.01) |

(52) U.S. Cl.
CPC .......... *C08L 53/00* (2013.01); *C08F 297/026* (2013.01); *C08L 33/08* (2013.01); *C08L 33/10* (2013.01); *C09J 133/08* (2013.01); *C09J 133/10* (2013.01); *C09J 153/00* (2013.01); *C08G 2170/20* (2013.01); *C08G 2261/126* (2013.01); *C08L 2205/025* (2013.01)

(58) Field of Classification Search
CPC .... C08F 297/026; C08F 293/00; C08L 33/10; C08L 33/08; C08L 53/00; C09J 133/10; C09J 133/08; C09J 153/00; C08G 2170/20; C08G 2261/126
See application file for complete search history.

(56) References Cited

U.S. PATENT DOCUMENTS

| 5,264,527 A | 11/1993 | Varshney et al. |
| 5,294,674 A | 3/1994 | Varshney et al. |
| 5,591,818 A | 1/1997 | Varshney et al. |
| 5,668,231 A | 9/1997 | Varshney et al. |
| 6,159,978 A | 12/2000 | Myers et al. |
| 6,180,632 B1 | 1/2001 | Myers et al. |
| 6,245,760 B1 | 6/2001 | He et al. |
| 6,329,480 B1 | 12/2001 | Uchiumi et al. |
| 6,524,347 B1 | 2/2003 | Myers et al. |
| 6,528,526 B1 | 3/2003 | Myers et al. |
| 6,734,256 B1 | 5/2004 | Everaerts et al. |
| 2001/0023250 A1 | 9/2001 | Spada et al. |
| 2002/0032290 A1 | 3/2002 | Uchiumi et al. |
| 2003/0130285 A1 | 7/2003 | Myers et al. |
| 2003/0139399 A1 | 7/2003 | Myers et al. |
| 2003/0139400 A1 | 7/2003 | Myers et al. |
| 2003/0144284 A1 | 7/2003 | Myers et al. |
| 2003/0191243 A1 | 10/2003 | Hamada et al. |
| 2004/0034183 A1 | 2/2004 | Kato et al. |
| 2004/0122161 A1 | 6/2004 | Paul et al. |
| 2004/0202881 A1 | 10/2004 | Everaerts et al. |
| 2005/0182054 A1 | 8/2005 | Myers et al. |
| 2005/0228135 A1 | 10/2005 | Paul et al. |
| 2006/0036030 A1 | 2/2006 | Kurihara et al. |
| 2008/0269404 A1 | 10/2008 | Paul et al. |
| 2009/0152383 A1 | 6/2009 | Kurihara et al. |
| 2009/0239433 A1 | 9/2009 | Kurihara et al. |
| 2009/0305068 A1 | 12/2009 | Morishita et al. |

FOREIGN PATENT DOCUMENTS

| JP | 6-93060 A | 4/1994 |
| JP | 7-25859 B2 | 3/1995 |
| JP | 11-323072 | 11/1999 |
| JP | 11-335432 A | 12/1999 |
| JP | 2002-533556 A | 10/2002 |
| JP | 2003-277574 A | 10/2003 |
| JP | 2004-204231 A | 7/2004 |

(Continued)

OTHER PUBLICATIONS

International Search Report dated Apr. 12, 2016, in PCT/JP2016/051641 filed Jan. 21, 2016.
Moineau et al., "Synthesis of fully acrylic thermoplastic elastomers by atom transfer radical polymerization (ATRP), 2", "Effect of the catalyst on the molecular control and the rheological properties of the triblock copolymers", Macromolecular Chemisry and Physics, vol. 201, (2001), pp. 1108-1114.
Extended European Search Report dated Jun. 14, 2018 in corresponding European Patent Application No. 16743211.1 citing documents AA-AD and AO therein, 10 pages.
Office Action dated Jun. 25, 2019, in Japanese patent application No. 2016-571977 (w/ English translation) 7 pages.

*Primary Examiner* — Robert S Jones
(74) *Attorney, Agent, or Firm* — Oblon, McClelland, Maier & Neustadt, L.L.P.

(57) ABSTRACT

[Object] To provide an acrylic block copolymer which can be used in an adhesive composition to give an excellent adhesive force, cohesive force, holding power, tack, and hot-melt coatability; and also to provide an adhesive composition containing such a block copolymer. [Solution] An acrylic block copolymer (I) contains at least two polymer blocks (A) containing methacrylic acid ester units and at least one polymer block (B) containing acrylic acid ester units, wherein the acrylic block copolymer (I) has structure of blocks (A)-(B)-(A), a weight average molecular weight (Mw) ranging from 30,000 to 100,000 and a melt viscosity of not more than 100,000 mPa·s, the melt viscosity being measured at 100° C. with a Brookfield viscometer.

17 Claims, No Drawings

(56) References Cited

FOREIGN PATENT DOCUMENTS

| | | | |
|---|---|---|---|
| JP | 2005-307063 | A | 11/2005 |
| JP | 2012-207155 | A | 10/2012 |
| JP | 2013-224430 | A | 10/2013 |
| JP | 2015-212316 | A | 11/2015 |
| WO | WO 02/26847 | A1 | 4/2002 |

ACRYLIC BLOCK COPOLYMER AND ADHESIVE COMPOSITION

TECHNICAL FIELD

The present invention relates to an acrylic block copolymer having a specific structure and to an adhesive composition containing such an acrylic block copolymer.

BACKGROUND ART

Acrylic adhesives (the term "pressure sensitive adhesives" refer to "pressure-sensitive adhesives") have an excellent heat resistance and weather resistance derived from the structure thereof and therefore have been widely used in adhesive materials, such as adhesive tapes and adhesive sheets, as compared with rubber adhesives in recent years. In general, acrylic adhesives are mainly classified into solution-type adhesives, emulsion-type adhesives, and hot-melt adhesives on the basis of the forms thereof. Among these adhesives, solution-type adhesives each contain an organic solvent used for dissolving materials. Solution-type adhesives are applied to substrates, and the organic solvent is evaporated to form adhesive layers on the substrates; hence, the impacts of the organic solvent on environment have been problematic. Emulsion-type adhesives are applied to substrates in the form of emulsion, and water is evaporated to form adhesive layers on the substrates, which generates problems of a wastewater treatment and a large energy consumption for drying. Hot-melt-type adhesives are applied to substrates in a thermally melted state to form adhesive layers on the substrates and are therefore less harmful to environment as well as excellent in safety. In addition, since the hot-melt-type adhesives eliminate use of organic solvents and a step for drying water, which are necessary in solution-type adhesives and emulsion-type adhesives, they enable high productivity of adhesive materials and have advantages in terms of energy conservation and resource saving.

Adhesives have been demanded to have further advanced performance these days, and development of a hot-melt-type acrylic adhesive having both adhesive properties, such as a cohesive force and an adhesive force, and hot-melt coatability has been highly demanded. Patent Literatures 1 and 2, for example, each disclose a hot-melt adhesive using an acrylic block copolymer; however, a adhesive having a small viscosity has not been known. Furthermore, in the case of using a adhesive containing, as a polymer component, only an acrylic block copolymer that is in the form of solid at room temperature, the hot-melt coatability is not necessarily sufficient, which is problematic.

CITATION LIST

Patent Literature

PTL 1: JPA (Translation of PCT Application) 2002-533556
PTL 2: JPA 2004-204231
PTL 3: JPB 1995-025859
PTL 4: JPA 1999-335432
PTL 5: JPA 1994-093060

Non Patent Literature

NPL 1: *Macromol. Chem. Phys.*; vol. 201; 2000; pp 1108-1114

SUMMARY OF INVENTION

Technical Problem

It is an object of the present invention to provide an acrylic block, copolymer that can be used in adhesive compositions to give an excellent adhesive force, cohesive force, holding power, tack, and hot-melt coatability. It is another object of the present invention to provide an adhesive composition containing such a block copolymer, a hot-melt adhesive containing the adhesive composition, and an adhesive product using the adhesive composition.

Solution to Problem

Intensive studies have been made to achieve the above-mentioned objects and reached the finding that use of an acrylic block copolymer having a specific structure enables production of an adhesive composition having a high adhesive force, cohesive force, and holding power and being excellent particularly in tack and hot-melt coatability, thereby accomplishing the present invention.

The present invention has the following aspects to achieve the above-mentioned objects:

[1] An acrylic block copolymer (I) containing at least two polymer blocks (A) containing methacrylic acid ester units and at least one polymer block (B) containing acrylic acid ester units, wherein the acrylic block copolymer (I) has a structure of blocks (A)-(B)-(A), a weight average molecular weight (Mw) ranging from 30,000 to 100,000, and a melt viscosity of not more than 100,000 mPa·s, the melt viscosity being measured at 100° C. with a Brookfield viscometer;

[2] The acrylic block copolymer (I) according to the aspect [1], wherein the whole polymer block (A) content is not more than 15 mass %, and the molecular weight distribution (Mw/Mn) of the acrylic block copolymer (I) is in the range of 1.0 to 1.5;

[3] The acrylic block copolymer (I) according to any one of the aspects [1] and [2], wherein the acrylic acid ester of the polymer block (B) is an acrylic acid ester represented by a general formula $CH_2=CH-COOR^1$ (where $R^1$ represents an organic group having 1 to 10 carbon atoms);

[4] The acrylic block copolymer (I) according to any one of the aspects [1] to [3], wherein the acrylic block copolymer is a triblock copolymer;

[5] The acrylic block copolymer (I) according to any one of the aspects [1] to [4], wherein the acrylic block copolymer at least has, as the polymer block (A), a polymer block (A1) and polymer block (A2) having different weight average molecular weights;

[6] The acrylic block copolymer (I) according to the aspect [5], wherein at least one or the polymer blocks (A1) and (A2) has a weight average molecular weight of not less than 300 and below 3,000;

[7] An adhesive composition containing (i) the acrylic block copolymer (I) according to any one of the aspects [1] to [6] and (ii) an acrylic block copolymer (II) containing at least one polymer block (C) containing methacrylic acid ester units and at least one polymer block (D) containing acrylic acid ester units, wherein the acrylic block copolymer (II) has a weight average molecular weight (Mw) ranging from 50,000 to 300,000 and has a melt viscosity of greater than 100,000 mPa·s, the melt viscosity being measured at 100° C. with a Brookfield viscometer;

[8] The adhesive composition according to the aspect [7], wherein the acrylic block copolymer (II) content is in the range of 1 to 500 parts by mass relative to the acrylic block copolymer (I) content of 100 parts by mass;

[9] The adhesive composition according to any one of the aspects [7] and [8], wherein the acrylic acid ester of the polymer block (D) of the acrylic block copolymer (II) is the same as the acrylic acid ester of the polymer block (B) of the acrylic block copolymer (I);

[10] The adhesive composition according to any one of the aspects [7] to [9], further containing a tackifying resin;

[11] A hot-melt adhesive containing the adhesive composition according to any one of the aspects [7] to [10]; and

[12] An adhesive product including an adhesive layer formed of the adhesive composition according to any one of the aspects [7] to [10].

Advantageous Effects of Invention

According to the present invention, an acrylic block copolymer which can be used in an adhesive composition to give an excellent adhesive force, cohesive force, holding power, tack, and hot-melt coatability can be provided. Furthermore, an adhesive composition containing such a block copolymer and being excellent in the above-mentioned properties, a hot-melt adhesive containing the adhesive composition, and an adhesive product using the adhesive composition can be provided.

DESCRIPTION OF EMBODIMENTS

The present invention will now be described in detail. The term "(meth)acrylic acid ester" herein comprehensively refers to "methacrylic acid ester" and "acrylic acid ester", and the term "(meth)acrylic" comprehensively refers to "methacrylic" and "acrylic".

(Acrylic Block Copolymer (I))

The acrylic block copolymer (I) of the present invention has at least two polymer blocks (A) containing methacrylic acid ester units and at least one polymer block (B) containing acrylic acid ester units, a structure of blocks (A)-(B)-(A), and a weight average molecular weight (Mw) of 30,000 to 100,000; in addition, the melt viscosity thereof measured: at 100° C. with a Brookfield viscometer is not more than 100,000 mPa·s.

(Polymer Block (A))

The acrylic block copolymer (I) has at least two polymer blocks (A) containing methacrylic acid ester units.

Examples of the methacrylic acid esters that are constitutional units of the polymer block (A) include methacrylic acid esters having no functional groups, such as methyl methacrylate, ethyl methacrylate, isopropyl methacrylate, n-propyl methacrylate, n-butyl methacrylate, isobutyl methacrylate, sec-butyl methacrylate, tert-butyl, methacrylate, n-hexyl methacrylate, cyclohexyl methacrylate, 2-ethylhexyl methacrylate, n-octyl methacrylate, lauryl methacrylate, tridecyl methacrylate, stearyl methacrylate, isobornyl methacrylate, phenyl methacrylate, and benzyl methacrylate, and methacrylic acid esters having a functional group, such as methoxyethyl methacrylate, ethoxyethyl methacrylate, diethylaminoethyl methacrylate, 2-hydroxyethyl methacrylate, 2-aminoethyl methacrylate, glycidyl methacrylate, and tetrahydrofurfuryl methacrylate.

Of these, in view of improving the heat resistance and durability of the resulting polymer, methacrylic acid esters having no functional groups are preferred; and methyl methacrylate, ethyl methacrylate, tert-butyl methacrylate, cyclohexyl methacrylate, isobornyl methacrylate, and phenyl methacrylate are more preferred. From the viewpoint of making the phase separation between the polymer block (A) and the polymer block (B) more definite for increasing the cohesive force, methyl methacrylate is further preferred. The polymer block (A) may contain one of these methacrylic acid esters or two or more of them. The acrylic block copolymer (I) contains at least two polymer blocks (A), and the methacrylic acid esters of the individual polymer blocks (A) may be the same as or different from each other. The proportion of the methacrylic acid ester units in the polymer block (A) is preferably not less than 60 mass %, more preferably not less than 80 mass %, further preferably not less than 90 mass %, and still further preferably not less than 95 mass % in the polymer block (A).

The weight average molecular weight, (MW) per single polymer block (A) is not particularly limited; it is preferably in the range of 300 to 10,000, and more preferably 500 to 7,000. In the case where the weight average molecular weight (Mw) of the polymer block (A) is below such a range, the cohesive force of the resulting acrylic block copolymer (I) is insufficient in some cases. In the case where the weight average molecular weight (Mw) of the polymer block (A) is above the range, the melt viscosity of the resulting acrylic block copolymer (I) is increased, and thus productivity of the adhesive composition is impaired in some cases. The weight average molecular weight (Mw) herein refers to a weight average molecular weight determined by gel permeation chromatography (GPC) in terms of standard polystyrene.

The methacrylic acid ester units of the individual polymer blocks (A) may have the same or different tacticities.

The acrylic block copolymer (I) of the present invention may have three or more polymer blocks (A) containing methacrylic acid ester units; in view of the balance between a cohesive force and hot-melt coatability, the acrylic block copolymer (I) preferably has two polymer blocks (A) containing methacrylic acid ester units.

The whole polymer block (A) content in the acrylic block copolymer (I) of the present invention is preferably not more than 15 mass %, and more preferably not more than 12 mass %. The whole polymer block (A) content is preferably not less than 2 mass %, and also preferably not less than 4 mass %. The whole polymer block (A) content within the above-mentioned ranges enables an adhesive composition containing the acrylic block copolymer (I) of the present invention to have an excellent cohesive force and enhanced tack and hot-melt coatability. Furthermore, such an adhesive composition is likely to have an excellent heat-resistant adhesiveness and holding power. The term "whole polymer block (A) content" herein refers to the whole (total) amount of the two or more polymer blocks (A) contained in the acrylic block copolymer (I).

(Polymer Block (B))

The acrylic block copolymer (I) has at least one polymer block (B) containing acrylic acid ester units.

Examples of the acrylic acid ester, which is the constitutional unit of the polymer block (B), include acrylic acid esters having no functional groups, such as methyl acrylate, ethyl acrylate, isopropyl acrylate, n-propyl acrylate, n-butyl acrylate, isobutyl acrylate, sec-butyl acrylate, tert-butyl acrylate, amyl acrylate, isoamyl acrylate, n-hexyl acrylate, 2-ethylhexyl acrylate, n-octyl acrylate, isooctyl acrylate, decyl acrylate, isobornyl acrylate, lauryl acrylate, octadecyl acrylate, cyclohexyl acrylate, phenyl acrylate, and benzyl acrylate, and acrylic acid esters having a functional group, such as methoxyethyl acrylate, ethoxyethyl acrylate, 2-hydroxyethyl acrylate, 2-aminoethyl acrylate, glycidyl acrylate, tetrahydrofurfuryl acrylate, diethylaminoethyl acrylate, and phenoxyethyl acrylate.

In particular, in view of the transparency and flexibility of an adhesive composition that is to be produced, an acrylic acid ester represented by a general formula $CH_2$=CH—$COOR^1$ (where $R^1$ represents an organic group having 1 to 10 carbon atoms) is preferred. More preferred are acrylic acid esters having no functional groups, such as methyl acrylate, ethyl acrylate, isopropyl acrylate, n-propyl acrylate, n-butyl acrylate, isobutyl acrylate, sec-butyl acrylate, tert-butyl acrylate, amyl acrylate, isoamyl acrylate, n-hexyl acrylate, 2-ethylhexyl acrylate, n-octyl acrylate, isooctyl acrylate, decyl acrylate, isobornyl acrylate, cyclohexyl acrylate, phenyl acrylate, and benzyl acrylate because they contribute to the definite phase separation between the polymer block (A) and the polymer block (B) and enable an adhesive composition to have a high cohesive force. Further preferred is at least one selected from methyl acrylate, n-butyl acrylate, 2-ethylhexyl acrylate, n-octyl acrylate, and isooctyl acrylate because it enables an adhesive composition to have a proper adhesiveness at room temperature and a steady adhesive force within a broad temperature range and at the broad range of peel speed.

The polymer block (B) may contain one of such acrylic acid esters or two or more thereof. In the case where the acrylic block copolymer (I) has two or more polymer blocks (B), the acrylic acid esters of the individual polymer blocks (B) may be the same as or different from each other. The proportion of the acrylic acid ester units in the polymer block (B) is preferably not less than 60 mass %, more preferably not less than 80 mass %, further preferably not less than 90 mass %, and still further preferably not less than 95 mass %.

The whole polymer block (B) content in the acrylic block copolymer (I) of the present invention is preferably not less than 85 mass %, and more preferably not less than 88 mass %. The whole polymer block (B) content is preferably not more than 98 mass %, and more preferably not more than 96 mass %. The whole polymer block (B) content within the above-mentioned ranges enables an adhesive composition containing the acrylic block copolymer (I) of the present invention to have an excellent cohesive force and enhanced tack and hot-melt coatability.

The glass transition temperature (Tg) of the polymer block (B) is preferably from −100 to 30° C., more preferably from −80 to 10° C., and further preferably from −70 to 0° C. The glass transition temperature of the polymer block (B) within such a range enables an adhesive composition containing it to have an excellent tack and adhesive force. The glass transition temperature herein, refers to an extrapolated onset temperature given from a curve obtained by DSC.

In the polymer block (A) and the polymer block (B), monomer components of one polymer block may be contained in the other polymer block provided that it does not impair the effects of the present invention. A tapered structure, for instance, may be provided at the boundary between the polymer block (A) and the polymer block (B). In the polymer block (A) and the polymer block (B), one polymer block does not need to contain monomer components that are contained in the other polymer block.

The polymer block (A) and the polymer block (B) may optionally contain other monomers. Examples of such other monomers include vinyl monomers having carboxyl groups such as (meth)acrylic acid, crotonic acid, maleic acid, maleic anhydride, and fumaric acid; vinyl monomers having functional groups, such as (meth)acrylamide, (meth)acrylonitrile, vinyl acetate, vinyl chloride, and vinylidene chloride; aromatic vinyl monomers such as styrene, α-methylstyrene, p-methylstyrene, and m-methylstyrene; conjugated diene monomers such as butadiene and isoprene; olefin monomers such as ethylene, propylene, isobutene, and octene; and lactone monomers such as ε-caprolactone and valerolactone. In the case where the polymer blocks contain any of these monomers, they are preferably used in an amount of not more than 20 mass %, more preferably not more than 10 mass %, and further preferably not more than 5 mass % relative to the total mass of the whole monomers contained in the individual polymer blocks.

When the polymer block (A) is "(A)" and the polymer block (B) is "(B)", the acrylic block copolymer (I) of the present invention has a structure of blocks (A)-(B)-(A) in which the polymer block (A), the polymer block (B), and the polymer block (A) are connected to each other in sequence. The acrylic block copolymer (I) of which this structure of blocks is present at least at part of the molecular chain enables production of an adhesive composition having an excellent adhesive force and holding power. In the acrylic block copolymer (I) of the present invention, the structure of blocks (A)-(B)-(A) may be in any form provided that the blocks are connected to each other in this manner; for example, it may be in a linear form, a branched form, a radial form, or a combination thereof. In particular, the polymer block A and the polymer block B are preferably connected to each other in a linear form. Examples of this form include a triblock copolymer with a structure of (A)-(B)-(A), a tetrablock copolymer with a structure of (A)-(B)-(A)-(B), and a pentablock copolymer with a structure of (A)-(B)-(A)-(B)-(A). One of multiple polymer blocks (A) or (B) may be the same as or different from another one of the polymer blocks (A) or (B) in the same structure, respectively. In this case, the term "different" refers to that at least one of monomer units contained in the polymer block, molecular weight, molecular weight distribution, tacticity, and proportions of monomer units (if multiple monomer units exist) and the form of a copolymer (random, gradient, or block) (if multiple monomer units exist) is different. In particular, the acrylic block, copolymer (I) is preferably a triblock copolymer with a structure of (A)-(B)-(A) because an adhesive composition containing such an acrylic block copolymer has an excellent cohesive force and holding power.

The acrylic block copolymer (I) preferably has, as the polymer block (A), at least a polymer block (A1) and polymer block (A2) having different weight average molecular weights. At least one of the polymer blocks (A1) and (A2) has a weight average molecular weight that is preferably 300 or more and less than 3,000, and more preferably 500 or more and less than 2,000. When the weight average molecular weight of at least one of the polymer blocks (A1) and (A2) is within such a range, the viscosity of the acrylic block copolymer (I) is in a proper range, and a hot-melt adhesive containing this acrylic block copolymer (I) therefore has a further enhanced hot-melt coatability. In addition, an adhesive composition containing such a block copolymer is likely to have an excellent tack and further enhanced heat-resistant adhesiveness and holding power.

In the case where the acrylic block copolymer (I) is a triblock copolymer, it preferably has a structure of (A1)-(B)-(A2) in which the two polymer blocks (A) are the polymer blocks (A1) and (A2) of which the weight average molecular weights are different from each other. The polymer block (A1) preferably has a larger weight average molecular weight than the polymer block (A2). The weight average molecular weight of the polymer block (A1) is preferably in the range of 3,000 to 10,000, and more preferably 3,000 to 7,000 in view of viscosity, a cohesive force, and handleability in a production process. The weight average molecular weight of the polymer block (A2) is preferably 300 or more and less than 3,000, and more preferably 500 or more and less than 2,000.

The glass transition temperature (Tg) of the polymer block (A1) is preferably in the range of 60 to 140° C., more preferably 70 to 130°, and further preferably 80 to 130° C. With a glass transition, temperature within such a range, the polymer block (A1) serves as a physical pseudo-crosslinking point at temperature for ordinary use of an adhesive, which gives a cohesive force; hence, an adhesive composition in which such a polymer block (A1) is used has excellent adhesive properties, durability, and heat resistance.

The glass transition temperature (Tg) of the polymer block (A2) is preferably in the range of 0 to 100° C., more preferably 5 to 80° C., and further preferably 10 to 50° C., The weight average molecular weight (Mw) of the acrylic block copolymer (I) is in the range of 30,000 to 100,000. It is preferably in the range of 35,000 to 90,000, and more preferably 40,000 to 60,000 in view of a cohesive force and handleability in a production process. The acrylic block copolymer (I) having a weight average molecular weight of less than 30,000 is insufficient in a cohesive force, and such a weight average molecular weight is therefore not preferred. A weight average molecular weight of greater than 100,000 impairs handleability in a production process and thus is not preferred.

The molecular weight distribution (Mw/Mn) of the acrylic block copolymer (I) is preferably from 1.0 to 1.5, and more preferably from 1.0 to 1.4.

The acrylic block copolymer (I) has a melt viscosity, which is determined at 100° C. with a Brookfield viscometer, of not more than 100,000 mPa·s. The melt viscosity is preferably in the range of 1,000 mPa·s to 100,000 mPa·s, and more preferably 5,000 mPa·s to 100,000 mPa·s. The acrylic block copolymer having such a melt viscosity is not solid but has a low fluidity at room temperature (approximately 25° C.) and can be used in an adhesive composition to give excellent workability. In the case where an adhesive composition containing the acrylic block copolymer (I) having a melt viscosity within such a range is used for solution coating, the solid concentration thereof can be enhanced, and thus the solution can be high-solid.

The acrylic block copolymer (I) may optionally has a functional group, such as a hydroxyl group, a carboxyl group, an acid anhydride group, an amino group, or a trimethoxysilyl group, on a side chain of the molecular structure thereof or at an end of the main chain provided that it does not impair the effects of the present invention.

(Production Process)

The acrylic block copolymer (I) of the present invention can be produced by any technique provided that an acrylic block copolymer satisfying the above-mentioned conditions can be produced. In general, block copolymers are produced by a technique that involves living polymerization of monomers constituting blocks. Examples of such a technique involving living polymerization include a technique involving anionic polymerization with the use of an organic alkali metal compound as a polymerization initiator in the presence of a mineral acid salt such as a salt of alkali metal or alkali earth metal (Patent Literature 3), a technique involving anionic polymerization with the use of an organic alkali metal compound as a polymerization initiator in the presence of an organoaluminum compound (Patent Literature 4), a technique involving polymerization with the use of an organic rare earth metal complex as a polymerization initiator (Patent Literature 5), and a technique involving radical polymerization with the use of an α-halogenated ester compound as an initiator in the presence of a copper compound (Non Patent Literature 1). Another example of the production process is a technique in which the monomers contained in blocks are polymerized with the use of a multivalent radical polymerization initiator or a multivalent radical chain transfer agent to produce a mixture partially containing the acrylic block copolymer of the present invention.

Among the above-mentioned production processes, the living anionic polymerization with the use of an organic alkali metal compound as a polymerization, initiator in the presence of an organoaluminum compound is preferred because it enables an enhancement in the transparency of the resulting block copolymer and a reduction in odor due to a decrease in residual monomers and particularly because a hot-melt adhesive containing the block copolymer is less likely to suffer from the occurrence of air bubbles after being used to attach a product. Such a technique is preferred also because the molecular structure of the polymer block of a methacrylic acid ester is highly syndiotactic, which leads to an enhancement in the heat resistance of the adhesive composition.

Examples of the organoaluminum compound include organoaluminum compounds represented by General Formula (1)

$$AlR^3R^4R^5 \qquad (1)$$

(where $R^3$, $R^4$, and $R^5$ each independently represent an optionally substituted alkyl group, an optionally substituted cycloalkyl group, an optionally substituted aryl group, an optionally substituted aralkyl group, an optionally substituted alkoxy group, an optionally substituted aryloxy group, or an N,N-disubstituted amino group; alternatively, $R^3$ represents any of these groups, and $R^4$ and $R^5$ are combined into an optionally substituted arylene dioxy group).

In view of high livingness in the polymerization and easy handling, preferred examples of the organoaluminum compound represented by General Formula (1) include isobutyl bis(2,6-di-tert-butyl-4-methylphenoxy)aluminum, isobutyl bis(2,6-di-tert-butylphenoxy)aluminum, and isobutyl[2,2'-methylene bis(4-methyl-6-tert-butylphenoxy)]aluminum.

Examples of the organic alkali metal compounds include alkyllithiums and alkyldilithiums, such as n-butyllithium, sec-butyllithium, isobutyllithium, tert-butyllithium, n-pentyllithium, and tetramethylenedilithium, aryllithiums and aryldilithiums, such as phenyllithium, p-tolyllithium, and lithium naphthalene; aralkyllithiums and aralkyldilithiums, such as benzyllithium, diphenylmethyllithium, and dilithium synthesized by the reaction of diisopropenylbenzene with butyl lithium; lithium amides such as lithium dimethylamide; and lithium alkoxides such as methoxylithium and ethoxylithium. These may be used alone or in combination. Of these, alkyllithiums are preferred in view of highly efficient initiation of polymerization; in particular, tert-butyllithium and sec-butyllithium are more preferred, and sec-butyllithium is further preferred.

The living anionic polymerization is generally carried out in the presence of a solvent inert to the polymerization reaction. Examples of the solvent include aromatic hydrocarbons such as benzene, toluene, and xylene; halogenated hydrocarbons such as chloroform, methylene chloride, and carbon tetrachloride; and ethers such as tetrahydrofuran and diethyl ether.

The acrylic block copolymer (I) can be produced by, for example, repeating a step for forming the intended polymer block (for instance, polymer block (A) or polymer block (B)) at an end of the intended living polymer, which has been obtained by polymerization of a monomer, a predetermined number of times and then terminating the polymerization reaction. Specifically, the acrylic block copolymer (I) can be produced by, for instance, carrying out multiple polymerization steps including a first step for polymerizing a monomer to form a first polymer block, a second step for polymerizing a monomer to form a second polymer block, and a third step for polymerizing a monomer to form a third polymer block, each step being carried out with the use of an organic alkali metal compound as a polymerization initiator in the presence of an organoaluminum compound and then allowing the active end of the resulting polymer to react with an alcohol or another material to terminate the polymerization reaction. Such a process enables production of a block terpolymer (triblock copolymer) consisting of polymer block (A)-polymer block (B)-polymer block (A), a block quaterpolymer consisting of polymer block (A)-polymer block (B)-polymer block (A)-polymer block (B), and a block copolymer with a penta- or more polymer blocks.

The polymerization temperature is preferably from 0 to 100°° C in the formation of the polymer block (A) and from −50 to 50° C. in the formation of the polymer block (B). If the polymerization temperature is below such ranges, the progress of the reaction is slow, and the reaction takes a long period of time to be completed. If the polymerization temperature is above the range, the living polymer end is more likely to be deactivated; as a result, the molecular weight distribution becomes broad, or the intended block copolymer is not obtained. The polymer block (A) and the polymer block (B) can be each formed by polymerization within a period ranging from 1 second to 20 hours.

(Adhesive Composition)

The adhesive composition of the present invention contains the acrylic block copolymer (I) and an acrylic block copolymer (II) that will be described below.

The acrylic block copolymer (I) has a structure including a "hard block" and a "soft block". The acrylic block copolymer (I) itself has adhesive properties but can be used particularly in combination with the acrylic block copolymer (II) to produce an adhesive composition having enhanced adhesive properties and good handle-ability and hot-melt coatability.

(Acrylic Block Copolymer (II))

The acrylic block copolymer (II) has at least one polymer block (C) containing methacrylic acid ester units and at least one polymer block (D) containing acrylic acid ester units and a weight average molecular weight (Mw) of 50,000 to 300,000; in addition, the melt viscosity thereof measured at 100° C. with a Brookfield Viscometer is greater than 100,000 mPa·s.

(Polymer Block (C))

The acrylic, block copolymer (II) has at least one polymer block (C) containing methacrylic acid ester units.

Specific and preferred examples of the methacrylic acid esters contained in the polymer block (c) include the methacrylic acid esters that can be contained in the polymer block (A). The polymer block (C) may contain one of the methacrylic acid esters or two or more thereof. In the case where the acrylic block copolymer (II) has two or more polymer blocks (C), the methacrylic acid esters of the individual polymer blocks (C) may be the same as or different from each other. In particular, the methacrylic acid ester contained in the polymer block (C) is preferably methyl methacrylate.

The proportion of the methacrylic acid ester units in the polymer block (C) is preferably not less than 60 mass %, more preferably not less than 80 mass %, and further preferably not less than 90 mass % in the polymer block (C).

The weight average molecular weight (Mw) per single polymer block (C) is not particularly limited, but it is preferably in the range of 3,000 to 50,000, and more preferably 4,000 to 30,000. The weight average molecular weight (Mw) of the polymer block (C) within such a range enables the resulting adhesive composition to have a further enhanced cohesive force and holding power.

In the case where two or more polymer blocks (c) exist, the methacrylic acid ester units of the individual polymer blocks (C) may have the same or different tacticities.

(Polymer Block (D))

The acrylic block copolymer (II) has at least one polymer block (D) containing acrylic acid ester units.

Specific and preferred examples of the acrylic acid esters contained in the polymer block (D) include the acrylic acid esters that can be contained in the polymer block (B). The polymer block (D) may contain one of the acrylic acid esters or two or more thereof. In the case where the acrylic block copolymer (II) has two or more polymer blocks (D), the acrylic acid esters of the individual polymer blocks (D) may be the same as or different from each other. In particular, the acrylic acid ester contained in the polymer block (D) is preferably methyl acrylate, n-butyl acrylate, or 2-ethylhexyl acrylate.

The proportion of the acrylic acid ester units in the polymer block (D) is preferably not less than 60 mass %, more preferably not less than 80 mass %, and further preferably not less than 90 mass %.

In the polymer block (C) and the polymer block (D), monomer components of one polymer block may be contained in the other polymer block provided that it does not impair the effects of the present invention. A tapered structure, for instance, may be provided at the boundary between, the polymer block (A) and the polymer block (B). In the polymer block (A) and the polymer block (B), one polymer block does not need to contain monomer components that are contained in the other polymer block.

The polymer block (C) and the polymer block (D) may optionally contain other monomers. Specific examples of such other monomers include other monomers that can foe used in the acrylic block copolymer (I). In the case where such other monomers are used, their contents are preferably not more than 20 mass %, and more preferably not more than 10 mass % relative to the total mass of the whole monomers contained in the individual polymer blocks.

The acrylic acid esters contained in the polymer block (D) of the acrylic block copolymer (II) may be the same as or different from the acrylic acid esters contained in the polymer block (B) of the acrylic block copolymer (I); in view of the compatibility of the compositions, the acrylic acid esters contained in the polymer block (D) are preferably the same as the acrylic acid esters contained in the polymer block (B).

When the polymer block (C) is "(C)" and the polymer block (D) is "(D)", the acrylic block copolymer (II) is preferably represented by any of the following general formulae:

[(C)-(D)]n

[(C)-(D)]n-(C)

(D)-[(C)-(D)]n

[(C)-(D)]n-Z

[(D)-(C)]n-Z (where n is an integer from 1 to 30, Z is a coupling site (coupling site after coupling agent reacts with polymer end to form chemical bond), and the symbol - represents atomic bonding between the individual polymer blocks; in the case where C and D are multiple in the formulae, the multiple polymer blocks C may be the same as or different from each other, and the multiple polymer blocks D may be the same as or different from each other). In this case, the term "different" refers to that at least one of monomer units contained in the polymer block, molecular weight, molecular weight distribution, tacticity, and proportions of monomer units (if multiple monomer units exist) and the form of a copolymer (random, gradient, or block) (if multiple monomer units exist) is different, n is preferably from 1 to 15, more preferably from 1 to 8, and further preferably from 1 to 4. In particular, a linear block copolymer represented by [(C)-(D)]n, [(C)-(D)]n-(C), or (D)-[(C)-(D)]n is preferred, and a triblock copolymer with a structure of (C)-(D)-(C) is more preferred because an adhesive composition containing such an acrylic block copolymer has; an excellent cohesive force and holding power.

The weight average molecular weight (Mw) of the acrylic block copolymer (II) is preferably in the range of 50,000 to 300,000. In particular, the Mw is more preferably from 50,000 to 200,000 in view of productivity when the adhesive composition of the present invention is heated and melted and then formed into a film by, for example, hot-melt coating, a T-die process, inflation, calendering, or lamination.

The molecular weight distribution (Mw/Mn) of the acrylic block copolymer (II) is preferably from 1.0 to 1.5, more preferably from 1.0 to 1.4, and further preferably from 1.0 to 1.3.

The polymer block (C) content in the acrylic block copolymer (II) used in the present invention is preferably in the range of 5 to 95 mass %, and the polymer block (D) content is preferably in the range of 95 to 5 mass %. The polymer block (C) content and the polymer block (D) content are more preferably in the range of 10 to 60 mass % and 90 to 40 mass %, further preferably 15 to 60 mass % and 85 to 40 mass %, and still further preferably 22 to 50 mass % and 78 to 50 mass %, respectively, because such contents enable the resulting adhesive composition to have excellent adhesive properties.

The melt viscosity of the acrylic block copolymer (II), which is measured at 100° C. with a Brookfield viscometer, is greater than 100,000 mPa·s, With a melt viscosity of greater than 100,000 mPa·s at 100° C., the acrylic block copolymer (II) can be handled in the form of a solid at room temperature; in addition, using such an acrylic block copolymer (II) as a base polymer of the adhesive composition gives an excellent cohesive force and holding power. The upper limit of the melt viscosity of the acrylic block copolymer (II), which is measured at 100° C. with a Brookfield viscometer, is not particularly limited; when the melt viscosity exceeds the measurement limit, it is determined that the melt viscosity is above 100,000 mPa·s and satisfies the requirement of the acrylic block copolymer (II) used in the present invention. The measurable upper limit of the melt viscosity is preferably up to 100,000,000 mPa·s.

The acrylic block copolymer (II) used in the present invention can be produced by any technique provided that an acrylic block copolymer satisfying the above-mentioned weight average molecular weight and melt viscosity can be produced. The acrylic block copolymer (II) can be, for example, produced by living anionic polymerization as in the production of the acrylic block copolymer (I) used in the present invention.

The adhesive composition of the present invention preferably contains 1 to 500 parts by mass of the acrylic block copolymer (II), and more preferably 10 to 400 parts by mass relative to 100 parts by mas of the acrylic block copolymer (I). The block copolymer (II) content in the adhesive composition in such a content range enables production of an adhesive composition of which the cohesive force and holding power are in excellent balance with tack and hot-melt coatability.

(Tackifying Resin)

Use of a tackifying resin in the adhesive composition of the present invention may make it easy to enhance and control the tack, adhesive force, and holding power thereof in some cases. Examples of usable tackifying resins include, but are not limited to, rosin derivatives such as rosin esters, gum rosin, tall oil rosin, hydrogenated rosin esters, maleinated rosin, and disproportionated rosin esters; terpenephenol resins and terpen resins mainly composed of, for instance, α-pinene, β-pinene, or limonene; and (hydrogenated) petroleum resins, coumarone-indene resins, hydrogenated aromatic copolymers, styrenic resins, phenolic resins, and xylene resins. These resins may be used alone or in combination. The tackifying resin content in the adhesive composition of the present invention is not particularly limited and can be properly determined on the basis of the intended use of an adhesive and types of adherend; in terms of an excellent cohesive force and adhesive force and an enhancement in coatability, the tackifying resin content is preferably in the range of 1 to 1,000 parts by mass, and more preferably 1 to 500 parts by mass relative to 100 parts by mass of the acrylic block copolymer (I) of the present invention.

(Plasticizer)

The adhesive composition of the present invention may optionally further contain a variety of plasticizers. Examples of the plasticizers include phthalates such as dibutyl phthalate, di-n-octyl phthalate, bis(2-ethylhexyl)phthalate, di-n-decyl phthalate, and diisodecyl phthalate; adipates such as bis(2-ethylhexyl) adipate and di-n-octyl adipate; sebacates such as bis (2-ethylhexyl) sebacate and di-n-butyl sebacate; azelates such as bis (2-ethylhexyl)azelate; paraffins such as chlorinated paraffin; glycols such as polypropylene glycol; epoxy-modified vegetable oils such as epoxidized soyabean oils and epoxidized linseed oils; phosphates such as trioctyl phosphate and triphenyl phosphate; phosphites such as triphenyl phosphite; ester oligomers such as esters of adipic acid with 1,3-butylene glycol; low molecular weight polymers such as low molecular weight polybutene, low molecular weight polyisobutylene, and low molecular weight polyisoprene; acrylic olygomers such as n-butyl polyacrylate and 2-ethylhexyl polyacrylate; and process oils such as paraffin oils and naphthenic oils. These plasticizers may be used alone or in combination. The plasticizer content is generally in the range of 1 to 1,000 parts by mass relative to 100 parts by mass of all the components of the adhesive other than the plasticizer.

Since the acrylic block copolymer (I) itself has adhesive properties and small viscosity, the adhesive composition of the present invention can serve as an adhesive composition without use of the above-mentioned tackifying resin and plasticizer.

(Other Additives)

The adhesive composition of the present invention may optionally contain other additives. Specific examples of such other additives include antioxidants and ultraviolet absorbers used for further enhancing weather resistance, heat resistance, and oxidation resistance; inorganic powder fillers such as calcium carbonate, titanium, oxide, mica, and talc; fibrous fillers such as glass fibers and organic reinforcing fibers; and polymers other than the acrylic block copolymers (I) and (II).

Examples of such other polymers include acrylic resins such as polymethyl methacrylate and (meth)acrylic acid ester copolymers (the acrylic block copolymers (I) and (II) are excluded); olefin resins such as polyethylene, ethylene-vinyl acetate copolymers, polypropylene, polybutene-1, poly-4-methylpentene-1, and polynorbornene; ethylene-containing ionomers; styrene resins such as polystyrene, styrene-maleic anhydride copolymers, high impact polystyrene, AS resins, ABS resins, AES resins, AAS resins, ACS resins, and MBS resins; styrene-methyl methacrylate copolymers; polyester resins such as polyethylene terephthalate, polybutylene terephthalate, and polylactic acid; polyamides such as nylon 6, nylon 66, and polyamide elastomers; polycarbonate; polyvinyl chloride; polyvinylidene chloride; polyvinyl alcohol; ethylene-vinyl alcohol copolymers; polyacetal; polvinylidene fluoride; polyurethane; modified polyphenylene ethers; polyphenylene sulfide; silicone-rubber-modified resins; acrylic rubbers; silicone rubbers; styrenic thermoplastic elastomers such as SEPS, SEBS, and SIS; and olefinic rubbers such as IR, EPR, and EPDM.

(Process for Producing Adhesive Composition)

A process for producing the adhesive composition of the present invention is not particularly limited. The composition can be produced by, for example, mixing and kneading the components of the adhesive composition using a known, mixer or kneader, such as a kneader-ruder, an extruder, a mixing roll, or a Banbury mixer, normally at a temperature ranging from 100° C. to 250° C. Alternatively, the adhesive composition of the present invention can be produced by dissolving the components thereof in an organic solvent, mixing this solution, and then removing the organic solvent through distillation.

(Applications)

The adhesive composition of the present invention can be easily melted under heating to gain higher fluidity and is therefore especially preferably used as a hot-melt adhesive. The adhesive composition of the present invention can be melted; applied to a substrate having a predetermined form including a film, a sheet, a tape, or another form, such as paper, a paper board, cellophane, a resin, cloth, wood, or metal, by hot-melt coating process, and then cooled to form an adhesive product having an adhesive layer of the adhesive composition of the present invention. The adhesive composition of the present invention can be dissolved in a solvent, such as toluene, to be in the form of a solution and used as a solvent adhesive. In this case, this solvent adhesive is applied to a substrate or another material, and then the solvent is evaporated, thereby being able to form an adhesive product. A layer of the adhesive composition of the present invention (adhesive layer) can be formed on a variety of substrates, such as paper, cellophane, plastic, materials, cloth, wood, and metal, to form a laminate including the adhesive layer; and the adhesive product may be in the form of this laminate. Since the adhesive composition of the present invention has an excellent transparency and weather resistance, application thereof to a substrate layer formed of a transparent material enables a production of a transparent laminate; hence, the adhesive composition is preferred. Examples of the substrate layer formed of a transparent material include, but are not limited to, substrate layers formed of polymers such as polyethylene terephthalate, triacetyl cellulose, polyvinyl alcohols, cycloolefin resins, styrene-methyl methacrylate copolymers, polypropylene, polyethylene, ethylene-vinyl acetate copolymers, polycarbonate, polymethyl methacrylate polyethylene, and polypropylene; substrate layers formed of a mixture of two or more of these polymers; and glass substrate layers.

Examples of an adhesive product formed of the adhesive composition of the present invention include adhesive sheets, adhesive films, adhesive tapes, pressure-sensitive tapes, masking tapes, electrical insulating tapes, and laminates. Representative examples of these adhesive products include adhesive, films and adhesive tapes each having a substrate film of which an adhesive layer has been formed of the adhesive composition of the present invention on at least part of the surface.

The adhesive composition of the present invention, the hot-melt adhesive containing the adhesive composition, and the adhesive product having an adhesive layer formed of the adhesive composition can be used in a variety of applications. Examples of the applications include surface protection, masking, shoes, binding, packaging, office uses, labels, decoration/display, book binding, bonding, dicing tapes, sealing, corrosion prevention/waterproofing, medical/sanitary uses, prevention of glass scattering, electrical insulation, holding and fixing of electronic equipment, production of semiconductors, optical display films, adhesive optical films, shielding from electromagnetic waves, and sealing materials of electric and electronic parts. Specific examples thereof are given below.

The adhesive tapes or films for surface protection can be used for a variety of materials, such as metals, plastics, rubbers, and wood; specifically, they can be used to protect the surfaces of coating, the surfaces of metals during deformation processing or deep drawing, the surfaces of automobile parts, and the surfaces of optical parts. Examples of the automobile parts include coated exterior plates, wheels, mirrors, windows, lights, and light covers. Examples of the optical parts include various image display devices, such as liquid crystal displays, organic EL displays, plasma displays, and field emission displays; films used in optical disks, such as polarizing films, polarizing plates, retardation plates, light guide panels, diffusion plates, and DVDs; and fine coat faceplates for electronic/optical uses.

Examples of the uses for masking include masking in manufacturing of printed wiring boards or flexible printed wiring boards; masking in plating or soldering for electronic equipment; and masking in manufacturing of vehicles such as automobiles, in coating of vehicles and buildings, in textile printing, and in parting of civil engineering works.

Examples of the uses for shoes include adhesive attachment of a shoe body (upper) to a shoe sole, a heel, an insole, decorative parts, or another parts and adhesive attachment of an outer sole to a midsole.

Examples of the uses for binding include binding of wire harnesses, electric wires, cables, fibers, pipes, coils, windings, steel materials, ducts, plastic bags, foods, vegetables, and flowering plants. Examples of the uses for packaging include heavy material packaging, packaging for export, sealing of corrugated fiberboard boxes, and can sealing. Examples of the office uses include general uses for office and uses for sealing, mending of books, drawing, and memorizing. Examples of the uses for labels include price display, merchandise display, tags, POP, stickers, stripes, nameplates, decoration, and advertisement.

Examples of the labels include labels having substrates, for instance, paper products such as paper, converted paper (paper subjected to aluminum deposition, aluminum lamination, vanishing, a resin treatment, or another treatments, and synthetic paper and films made of cellophane, plastic materials, cloth, wood, or metals. Specific examples of the substrate include woodfree paper, art paper, cast-coated paper, thermal paper, foil paper, polyethylene terephthalate films, polyvinyl chloride films, OPP films, polylactic acid films, synthetic paper, thermal synthetic paper, and overlaminate films.

Examples of adherends for the labels include plastic products such as plastic bottles and foamed plastic cases; paper or corrugated fiberboard products, such as corrugated fiber-board boxes; glass products such as glass bottles; metal products; and other products made of inorganic materials, such as ceramic products.

Examples of the uses for decoration/display include caution seals, line tapes, wiring markings, after-glow luminous adhesive tapes, and reflective sheets.

Examples of the adhesive optical films include optical films each having an adhesive layer farmed on the whole or at least part of one or both sides thereof, such as polarizing films, polarizing plates, retardation films, viewing angle enlarging films, luminance improving films, anti-reflection films, antiglare films, color filters, light guide panels, diffusion films, prism sheets, electromagnetic wave shielding films, near infrared absorbing films, functional composite optical films, films for ITO lamination, impact-resistance-imparting films, and visibility improving films. Such adhesive optical films include films in which an adhesive layer has been formed of the adhesive composition of the present, invention on a protective film used for protecting the surfaces of the above-mentioned optical films.

Examples of the uses for electrical insulation include protective covering or insulation of coils, and layer insulation such as motor/transformer layer insulation. Examples of the uses for holding and fixing of electrical equipment include carrier tapes, packaging, fixing of cathode ray tubes, splicing, and rib reinforcement. Examples of the uses for production of semiconductors include protection of silicon wafers. Examples of the uses for bonding include bonding in various adhesive fields, automobiles, electric trains, electric equipment, fixing of printing plates, bonding for construction, fixing of nameplates, bonding in general homes, and bonding to rough surfaces, irregular surfaces, and curved surfaces. Examples of the uses for sealing include sealing for heat insulation, vibration isolation, waterproofing, moisture proofing, sound insulation, and dust proofing. Examples of the uses for corrosion prevention/waterproofing include corrosion prevention for gas pipes and water pipes, corrosion prevention for large diameter pipes, and corrosion prevention for civil engineering buildings.

Examples of the medical/sanitary uses include uses for percutaneous absorbent preparations, such as analgesic anti-inflammatory agents (plasters and poultices), plasters for cold, antipruritic patches, and keratin softening agents; uses for various tapes, such as first-aid adhesive plasters (containing germicide), surgical dressings/surgical tapes, adhesive plasters, hemostatic tapes, tapes for human waste disposal devices (artificial anus fixing tapes, tapes for stitching, antibacterial tapes, fixing tapings, self-adhesive bandages, adhesive tapes for oral mucosa, tapes for sporting, and depilatory tapes; uses for beauty, such as facial packs, moistening sheets for skin round the eye, and keratin peel packs; binding uses in sanitary materials such as diapers and sheets for pets; and cooling sheets, pocket body warmers, and uses for dust proofing, waterproofing, and noxious insect capture.

Examples of the uses for sealing materials of electronic and electric parts include uses in liquid crystal displays, organic EL displays, organic EL lighting, and solar batteries.

EXAMPLES

The present invention will now be further specifically described on the basis of, for instance. Examples but is not limited thereto.

Physical properties in Examples and Comparative Examples were measured or evaluated as follows.

(1) The weight average molecular weights (Mw) and molecular weight distributions (Mw/Mn) of acrylic block copolymers (I-1) to (I-4) and (II-1) to (II-3) and the weight average molecular weights (Mw) of the polymer blocks (A1) and (C1) of the acrylic block copolymers (I-1) to (I-4) and (II-1) to (II-3) were measured by gel permeation chromatography (hereinafter abbreviated as "GPC") in terms of standard polystyrene.

Equipment: GPC equipment "HLC-8020" manufactured by Tosoh Corporation

Separation Column: "TSKgels GMHXL", "G4000HXL", and "G5000HXL" (manufactured by Tosoh Corporation) connected in series Eluent: Tetrahydrofuran Flow rate of eluent: 1.0 ml/min Column temperature: 40° C.

Detection: Based on differential refractive index (RI)

(2) The weight average molecular weights (Mw) of the polymer blocks (B), (D), (A2), and (C2) of the acrylic block copolymers (I-1) to (I-4) and (II-1) to (II-3) were measured as follows by the same GPC as in the above-mentioned measurement (1).

The weight average molecular weights (Mw) of the polymer blocks (B) and (D)

Sampling liquids of diblocks ((A1)-(B) and (C1)-(D)) were analyzed by GPC in the manner described in the measurement (1) to determine weight average molecular weights (Mw). From these weight average molecular weights, the weight average molecular weights (Mw) of the polymer blocks (A1) and (C1) were separately subtracted to determine the weight average molecular weights (Mw) of the polymer blocks (B) and (D).

The weight average molecular weights (Mw) of the polymer blocks (A2) and (C2)

The weight average molecular weights (Mw) of the polymer blocks (A2) and (C2) were determined by subtracting the weight average molecular weights (Mw) of the diblocks from the weight average molecular weights (Mw) of the acrylic block copolymers.

(3) The individual polymer block contents in the acrylic block copolymers (I-1) to (I-4) and (II-1) to (II-3) were determined by a $^1$H-NMR analysis.

Equipment: Nuclear magnetic resonance apparatus "JNM-ECX400" manufactured by JEOL Ltd.

Solvent: Deuterated chloroform

In a $^1$H-HMR spectrum, signals in the vicinities of 3.6 ppm and 4.0 ppm were attributed to the ester groups of methyl methacrylate units (—O—$CH_3$) and the ester groups of acrylic acid ester units (—O—$CH_2$—$CH_2$—$CH_2$—$CH_3$ or —O—C$H_2$—CH(—$CH_2$—$CH_3$)—$CH_2$—$CH_2$—$CH_2$—$CH_3$), respectively; and each copolymerization component content was determined by a ratio of their integral values.

(4) The proportions of monomers contained in the polymer block (B) in the acrylic block copolymer (I-4) were determined by a $^1$H-NMR analysis.

Equipment: Nuclear magnetic resonance apparatus "JNM-ECX400" manufactured by JEOL Ltd.

Solvent: Deuterated chloroform

In the $^1$H-NMR spectrum of the mixed monomers used in polymerization of the polymer block (B), signals in the vicinities of 4.1 ppm and 4.2 ppm were attributed to the ester group of n-butyl acrylate (—O—C$\underline{H}_2$—CH$_2$—CH$_2$—CH$_3$) and the ester group of 2-ethylhexyl acrylate (—O—C$\underline{H}_2$CH(—CH$_2$—CH$_3$)—CH$_2$—CH$_2$—CH$_2$CH$_3$), respectively; and the monomer contents based on a molar ratio were determined by a ratio of their integral values. The determined, monomer contents were converted into a mass ratio on the basis of the molecular weights of the monomer units to determine the mass ratio of the monomers contained in the polymer block (B).

(5) Melt Viscosity;

The melt viscosity of an acrylic block copolymer heated to a temperature ranging from 100 to 160° C. was measured with a Brookfield viscometer. The spindle used was No. 29.

(6) Adhesive Force at 180°;

An adhesive tape having a thickness or 25 μm was produced and shaped so as to have a width of 25 mm and a length of 100 mm. The resulting tape was attached to a stainless steel (SUS 304) plate (subjected to bright annealing (hereinafter referred to as BA)), and this produced sample was stored at room temperature (stored for 24 hours after the attachment unless otherwise specified). Then, the tape was removed at 23° C. at a speed of 300 mm/min in the direction of 180° for the measurement. In the case where the stick slip occurred, the maximum value was used to evaluate an adhesive force.

(7) Holding Power (SAFT);

Holding power was measured in accordance with ASTM D4498. In particular, an adhesive tape having a thickness of 25 μm was formed and attached to a stainless steel (SUS 304) plate (subjected to BA) at a width of 25 mm and a length of 25 mm. The resulting product was hung with a load of 500 g, and the temperature was increased from 40° C. to 205° C. at a rate of 0.5° C./min to determine the temperature at which the load fell.

(8) Holding Power (Creep);

Holding power was measured in accordance with JIS Z0237. In particular, an adhesive tape having a thickness of 25 μm was formed and attached to a stainless steel (SUS 304) plate (subjected to BA) at a width of 25 mm and a length of 25 mm. The resulting product was hung with a load of 1 kg at 60° C., and the duration before the falling of the load or the distance for which the load moved over 1000 minutes was determined.

(9) Ball Tack;

Ball tack was measured in accordance with JIS Z0237. Specifically, an adhesive tape having a thickness of 25 μm and placed at an inclination angle of 30° was prepared. On the tape, balls based on a bail tack method were rolled to determine the grade of the largest one of balls which had stopped on the adhesive tape.

(10) 90° Peel Creep;

An adhesive tape formed so as to have a thickness of 25 μm (25 mm×150 mm) was attached to a stainless steel (SUS 304) plate (subjected to BA) at 23° C. in an attachment area of 25 mm×100 mm, and the residual part of the tape was bent such that the adhesive side was inside. The stainless steel plate was horizontally fixed such that the adhesive tape side faced down, and then the bent part was hung with a weight of 30 g or 50 g at 23° C. and left to stand. The duration before the falling of the weight or the distance of peeling after 60 minutes was determined.

(11) Hot-melt Coatability;

Hot-melt adhesives produced in Examples and Comparative Examples were each applied to a 100-μm thick polyester film at 180° C. with a coater such that the coating had a thickness of 40 μm. This product was visually observed and evaluated as follows on the basis of the state of the surface of the coating: (A) (Good, the surface of the coating was like a mirror surface) and (B) (Bad, the surface of the coating was rough, or the coating had clear unevenness).

Examples 1 to 4 and Reference Examples 1 TO 3

Example 1

Synthesis of Acrylic Block Copolymer (I-1)

(1) The interior of a 2-L three-neck flask equipped with a three-way cock was purged with nitrogen, and 1002 g of toluene and 55.2 g of 1,2-dimethoxyethane were added thereto at room temperature under stirring. Then, 34.3 g of a toluene solution containing 17.2 mmol of isobutylbis (2,6-di-t-butyl-4-methylphenoxy) aluminum was added thereto, and 4.05 g of a solution of sec-butyllithium in cyclohexane, which contained 6.90 mmol of sec-butyllithium, was further added.

(2) Then, 25.4 g of methyl methacrylate was added thereto. The reaction liquid had initially colored yellow and became colorless after being stirred at room temperature for 60 minutes. Part of the resulting solution was sampled and analyzed by GPC in the above-mentioned manner to determine the weight average, molecular weight (Mw).

(3) The internal temperature of the polymerization liquid was decreased to −30° C., 358 g of n-butyl acrylate was dropped thereto over 2 hours, and the resulting solution was stirred at −30° C. for 5 minutes after the dropping. Part of the resulting solution was sampled and analyzed by GPC in the above-mentioned manner to determine the weight average molecular weight (Mw).

(4) Then, 5.64 g of methyl methacrylate was added thereto, and the solution was stirred overnight at room temperature.

(5) To the solution, 14.3 g of methanol was added to terminate the polymerization reaction. The resulting reaction liquid was added to 15 kg of methanol to generate a liquid precipitate. Then, the liquid precipitate was retrieved and dried to obtain 370 g of an acrylic block copolymer (I-1).

Example 2

Synthesis of Acrylic Block Copolymer (I-2)

(1) The interior of a 2-L three-neck flask equipped with a three-way cock was purged with nitrogen, and 899 g of toluene and 63.4 g of 1,2-dimethoxyethane were added thereto at room temperature under stirring. Then, 39.4 g of a toluene solution containing 19.8 mmol of isobutylbis (2,6-di-t-butyl-4-methylphenoxy)aluminum was added thereto, and 4.65 g of a solution of sec-butyllithium in cyclohexane, which contained 7.92 mmol of sec-butyl lithium, was further added.

(2) Then, 25.3 g of methyl methacrylate was added thereto. The reaction liquid had initially colored yellow and became colorless after being stirred at room temperature for 60 minutes. Part of the resulting solution was sampled and analyzed by GPC in the above-mentioned manner to determine the weight average, molecular weight (Mw).

(3) The internal temperature of the polymerization liquid was decreased to: −30° C., 373 g of n-butyl acrylate was dropped thereto over 2 hours, and the resulting solution was stirred at −30° C. for 5 minutes after the dropping. Part of the resulting solution was sampled and analyzed by GPC in the above-mentioned manner to determine the weight average molecular weight (Mw).

(4) Then, 6.48 g of methyl methacrylate was added thereto, and the solution was stirred overnight at room temperature.

(5) To the solution, 16.4 g of methanol was added to terminate the polymerization reaction. The resulting reaction liquid was added to 15 kg of methanol to generate a liquid precipitate. Then, the liquid precipitate was retrieved and dried to obtain 385 g of an acrylic block copolymer (I-2).

Example 3

Synthesis of Acrylic Block Copolymer (I-3)

(1) The interior of a 2-L three-neck flask equipped with a three-way cock was purged with nitrogen, and 859 g of toluene and 67.7 g of 1,2-dimethoxyethane were added thereto at room temperature under stirring. Then, 42.1 g of a toluene solution containing 21.2 mmol of isobutylbis (2,6-di-t-butyl-4-methylphenoxy)aluminum was added thereto, and 4.97 g of a solution of sec-butyllithium in cyclohexane, which contained 8.46 mmol of sec-butyllithium, was further added.

(2) Then, 24.2 g of methyl methacrylate was added thereto. The reaction liquid had initially colored yellow and became colorless after being stirred at room temperature for 60 minutes. Part of the resulting solution was sampled and analyzed by GPC in the above-mentioned manner to determine the weight average molecular weight (Mw).

(3) The internal temperature of the polymerization liquid was decreased to −30° C., 358 g of n-butyl acrylate was dropped thereto over 2 hours, and the resulting solution was stirred at −30° C. for 5 minutes after the dropping. Part of the resulting solution was sampled and analyzed by GPC in the above-mentioned manner to determine the weight average molecular weight (Mw).

(4) Then, 6.92 g of methyl methacrylate was added thereto, and the solution was stirred overnight at room temperature.

(5) To the solution, 17.5 g of methanol was added to terminate the polymerization reaction. The resulting reaction liquid was added to 15 kg of methanol to generate a liquid precipitate. Then, the liquid precipitate was retrieved and dried to obtain 370 g of an acrylic block Copolymer (I-3).

Example 4

Synthesis of Acrylic Block Copolymer (I-4)

(1) The interior of a 2-L three-neck flask equipped with a three-way cock was purged with nitrogen, and 752 g of toluene and 93.9 g of 1,2-dimethoxyethane were added thereto at room temperature under stirring. Then, 47.8 g of a toluene solution containing 24.1 mmol of isobutylbis (2,6-di-t-butyl-4-methylphenoxy) aluminum was added thereto, and 6.89 g of a solution of sec-butyllithium in cyclohexane, which contained 11.7 mmol of sec-butyllithium, was further added.

(2) Then, 33.6 g of methyl methacrylate was added thereto. The reaction liquid had initially colored yellow and became colorless after being stirred at room temperature for 60 minutes. Part of the resulting solution was sampled and analyzed by GPC in the above-mentioned manner to determine the weight average, molecular weight (Mw).

(3) The internal, temperature of the polymerization liquid was decreased to −30° C., 497 g of a mixture of n-butyl acrylate and 2-ethylhexyl acrylate (mass ratio: 50/50) was dropped thereto over 2 hours, and the resulting solution was stirred at −30° C. for 5 minutes after the dropping. Part of the resulting solution was sampled and analyzed by GPC in the above-mentioned manner to determine the weight average molecular weight (Mw).

(4) Then, 9.60 g of methyl methacrylate was added thereto, and the solution was stirred overnight at room temperature.

(5) To the solution, 21.7 g of methanol was added to terminate the polymerization reaction. The resulting reaction liquid was added to 15 kg of methanol to generate a liquid precipitate. Then, the liquid precipitate was retrieved and dried to obtain 510 g of an acrylic block copolymer (I-4).

Reference Example 1

Synthesis of Acrylic Block Copolymer (II-1)

(1) The interior of a 2-L three-neck flask equipped with a three-way cock was purged with nitrogen, and 903 g of toluene and 58.3 g of 1,2-dimethoxyethane were added thereto at room temperature under stirring. Then, 36.2 g of a toluene solution containing 18.2 mmol of isobutylbis (2,6-di-t-butyl-4-methylphenoxy)aluminum was added thereto, and 4.27 g of a solution of sec-butyllithium in cyclohexane, which contained 7.28 mmol of sec-butyllithium, was further added.

(2) Then, 26.8 g of methyl methacrylate was added thereto. The reaction liquid had initially colored yellow and became colorless after being stirred at room temperature for 60 minutes. Part of the resulting solution was sampled and analyzed by GPC in the above-mentioned manner to determine the weight average molecular weight (Mw).

(3) The internal temperature of the polymerization liquid was decreased to −30° C., 378 g of n-butyl acrylate was dropped thereto over 2 hours, and the resulting solution was stirred at −30° C. for 5 minutes after the dropping.

(4) To the solution, 15.0 g of methanol was added to terminate the polymerization reaction. The resulting reaction liquid was added to 15 kg of methanol to generate a liquid precipitate. Then, the liquid precipitate was retrieved and dried to obtain 380 g of an acrylic block copolymer (II-1).

Reference Example 2

Synthesis of Acrylic Block Copolymer (II-2)

(1) The interior of a 2-L three-neck flask equipped with a three-way cock was purged with nitrogen, and 868 g of toluene and 43.4 g of 1,2-dimethoxyethane were added thereto at room temperature under stirring. Then, 60.0 g of a toluene solution containing 40.2 mmol of isobutylbis (2,6-di-t-butyl-4-methylphenoxy)aluminum was added thereto, and 2.89 g of a solution of sec-butyllithium in cyclohexane, which contained 5.00 mmol of sec-butyllithium, was further added.

(2) Then, 35.9 g of methyl methacrylate was added thereto. The reaction liquid had initially colored yellow and became colorless after being stirred at room temperature for 60 minutes. Part of the resulting solution was sampled and analyzed by GPC in the above-mentioned manner to determine the weight average molecular weight (Mw).

(3) The internal temperature of the polymerization liquid was decreased to −30° C., 240 g of n-butyl acrylate was dropped thereto over 2 hours, and the resulting solution was stirred at −30° C. for 5 minutes after the dropping. Part of the resulting solution was sampled, and analyzed by GPC in the above-mentioned manner to determine the weight average molecular weight (Mw).

(4) Then, 35.9 g of methyl methacrylate was added thereto, and the solution was stirred overnight at room temperature.

(5) To the solution, 3.50 g of methanol was added to terminate the polymerization reaction. The resulting reaction liquid was added to 15 kg of methanol to generate a liquid precipitate. Then, the liquid precipitate was retrieved and dried to obtain 300 g of an acrylic block copolymer (II-2).

Reference Example 3

Synthesis of Acrylic Block Copolymer (II-3)

(1) The interior of a 2-L three-neck flask equipped with a three-way cock was purged with nitrogen, and 9.39 g of toluene and 21.8 g of 1,2-dimethoxyethane were added thereto at room temperature under stirring. Then, 32.4 g of a toluene solution containing 16.3 mmol of isobutylbis (2,6-di-t-butyl-4-methylphenoxy)aluminum was added thereto, and 1.59 g of a solution of sec-butyllithium in cyclohexane, which contained 2.72 mmol of sec-butyllithium, was further added.

(2) Then, 21.7 g of methyl methacrylate was added thereto. The reaction liquid had initially colored yellow and became colorless after being stirred at room temperature for 60 minutes. Part of the resulting solution was sampled and analyzed by GPC in the above-mentioned manner to determine the weight average molecular weight (Mw).

(3) The internal temperature of the polymerization liquid was decreased to −30°°C., 273 g of n-butyl acrylate was dropped thereto over 2 hours, and the resulting solution was stirred at −30° C. for 5 minutes after the dropping. Part of the resulting solution was sampled and analyzed by GPC in the above-mentioned manner to determine the weight average molecular weight (Mw).

(4) Then, 30.2 g of methyl methacrylate was added thereto, and the solution was stirred overnight at room temperature.

(5) To the solution, 10.2 g of methanol was added to terminate the polymerization reaction. The resulting reaction liquid was added to 15 kg of methanol to generate a liquid precipitate. Then, the liquid precipitate was retrieved and dried to obtain 310 g of an acrylic, block copolymer (II-3).

Reference Example 4

Synthesis of Acrylic Block Copolymer (II-4)

(1) The interior of a 2-L three-neck flask equipped with a three-way cock was purged with nitrogen, and 871 g of toluene and 105 g of 1,2-dimethexyethane were added thereto at room temperature under stirring. Then, 49.4 g of a toluene solution containing 24.8 mmol of isobutylbis (2,6-di-t-butyl-4-methylphenoxy)aluminum was added thereto, and 7.67 g of a solution of sec-butyllithium in cyclohexane, which contained 13.1 mmol of sec-butyllithium, was further added.

(2) Then, 33.3 g of methyl methacrylate was added thereto. The reaction liquid had initially colored yellow and became colorless after being stirred at room temperature for 60 minutes. Part of the resulting solution was sampled and analyzed by GPC in the above-mentioned manner to determine the weight average molecular weight (Mw).

(3) The internal temperature of the polymerization liquid was decreased to −30° C., 333 g of n-butyl acrylate was dropped thereto over 2 hours, and the resulting solution was stirred at −30° C. for 5 minutes after the dropping. Part of the resulting solution was sampled and analyzed by GPC in the above-mentioned manner to determine the weight average molecular weight (Mw).

(4) Then, 33.3 g of methyl methacrylate was added thereto, and the solution was stirred overnight at room temperature.

(5) To the solution, 22.8 g of methanol was added to terminate the polymerization reaction. The resulting reaction liquid was added to 15 kg of methanol to generate a liquid precipitate. Then, the liquid precipitate was retrieved and dried to obtain 380 g of an acrylic block copolymer (II-4).

Table 1 shows the weight average molecular weights (Mw), molecular weight distributions (Mw/Mn), the structures of the blocks, the content percentages and weight average molecular weights (Mw) of the polymer blocks, the constituent of the polymer block (B) or (D), and melt viscosity of the acrylic block copolymers (I-1) to (I-4) and (II-1) to (II-4) obtained in Examples 1 to 4 and Reference Examples 1 to 4.

TABLE 1

|  | Example 1 | Example 2 | Example 3 | Example 4 | Reference Example 1 | Reference Example 2 | Reference Example 3 | Reference Example 4 |
| --- | --- | --- | --- | --- | --- | --- | --- | --- |
| Block copolymer | I-1 | I-2 | I-3 | I-4 | II-1 | II-2 | II-3 | II-4 |
| Mw of block copolymer | 69,000 | 62,500 | 56,300 | 48,600 | 65,900 | 71,100 | 136,100 | 42,000 |
| Mw/Mn of block copolymer | 1.08 | 1.09 | 1.09 | 1.10 | 1.18 | 1.18 | 1.29 | 1.05 |
| Structure of blocks | (A1)-(B)-(A2) | (A1)-(B)-(A2) | (A1)-(B)-(A2) | (A1)-(B)-(A2) | (C1)-(D) | (C1)-(D)-(C2) | (C1)-(D)-(C2) | (A1)-(B)-(A2) |
| Polymer block (A) or (C) content (mass %) ((A1) + (A2)) or ((C1) + (C2)) | 7.9 | 8.0 | 8.1 | 8.1 | 6.8 | 23.5 | 16.1 | 16.6 |

TABLE 1-continued

| | Example 1 | Example 2 | Example 3 | Example 4 | Reference Example 1 | Reference Example 2 | Reference Example 3 | Reference Example 4 |
|---|---|---|---|---|---|---|---|---|
| Polymer block (B) or (D) content (mass %) | 92.1 | 92.0 | 91.9 | 91.9 | 93.2 | 76.5 | 83.9 | 83.4 |
| Mw of polymer block (A1) or (C1) | 4,500 | 4,000 | 3,500 | 3,500 | 4,500 | 8,750 | 9,770 | 3,500 |
| Mw of polymer block (B) or (D) | 63,500 | 57,500 | 51,750 | 44,400 | 61,400 | 53,600 | 114,000 | 35,000 |
| Mw of polymer block (A2) or (C2) | 1,000 | 1,000 | 1,000 | 700 | — | 8,750 | 12,330 | 3,500 |
| Constituent of polymer block (B) or (D) | nBA | nBA | nBA | nBA/2EHA = 50/50 | nBA | nBA | nBA | nBA |
| Melt viscosity (mPa · s) | | | | | | | | |
| 100° C. | 62,200 | 35,000 | 25600 | 19,000 | 42,900 | >3,000,000 | >3,000,000 | 83,900 |
| 130° C. | 15,600 | 9,500 | 7,300 | 4,600 | 11,000 | >3,000,000 | >3,000,000 | 15,000 |
| 160° C. | 5,500 | 3,500 | 2,800 | 1,500 | 4,000 | >3,000,000 | >3,000,000 | 3,600 |

In Examples 5 to 13, Comparative Examples 1 to 4, and Reference Examples 5 to 7, the following tackifying resin and plasticizer were used.

Tackifying resin: trade name "PINECRYSTAL KE-311", manufactured by ARAKAWA CHEMICAL INDUSTRIES, LTD., colorless rosin derivatives, softening point of 90 to 100° C.

Plasticizer: tradename "ARUFON UP1000O", manufactured by TOAGOSEI CO., LTD., acrylic oligomer

Examples 5 to 13, Comparative Examples 1 to 4, and Reference Examples 5 to 7

The acrylic block copolymers (I-1) to (I-3) and (II-1) to (II-4) produced in Examples 1 to 4 and Reference Examples 1 to 4, respectively, and the above-mentioned tackifying resin and plasticizer were dissolved in toluene at mass ratios shown in Tables 2 and 3 to produce toluene solutions containing an adhesive composition at a concentration of 40 mass %. These toluene solutions were each applied to a polyethylene terephthalate film (TOYOBO ESTER FILM B5000, thickness: 50 μm) with a coater such that the adhesive layer thereof after drying had a thickness of 25 μm, and then the film was dried and heated at 60° C. for 20 minutes to produce an adhesive tape. In the case where the produced adhesive tape needed to be attached to an adherend for an evaluation, it was attached with a 2-kg roller moved back and forth twice at a speed of 10 mm/sec and then subjected to the evaluation.

The acrylic block copolymers (I-1) to (I-3) and (II-1) to (II-4) produced in Examples 1 to 4 and Reference Examples 1 to 4, respectively, and the above-mentioned tackifying resin and plasticizer were melt-kneaded at mass ratios shown in Table 2 to produce a hot-melt adhesive.

The produced adhesive tapes and hot-melt adhesives were subjected to the above-mentioned evaluations of the physical properties, and Tables 2 and 3 show results of the evaluations.

TABLE 2

| | | Example 5 | Example 6 | Example 7 | Example 8 | Example 9 | Example 10 |
|---|---|---|---|---|---|---|---|
| Composition | Block copolymer (I-1) | 100 | | | 100 | | |
| | Block copolymer (I-2) | | 100 | | | 100 | |
| | Block copolymer (I-3) | | | 100 | | | 100 |
| | Block copolymer (II-1) | | | | | | |
| | Block copolymer (II-2) | 50 | 50 | 50 | | | |
| | Block copolymer (II-3) | | | | 50 | 50 | 50 |
| | Block copolymer (II-4) | | | | | | |
| | Plasticizer: UR1000 | | | | | | |
| Adhesive force to SUS (N/25 mm) | | 12.7 | 13.7 | 13.1 | 15.0 | 15.0 | 15.1 |
| Creep (distance moved: mm or duration before falling: min) | | 0.3 mm | 0.4 mm | 0.4 mm | 0.2 mm | 0.3 mm | 0.4 mm |
| SAFT (Temperature at falling: ° C.) | | 112 | 109 | 106 | 119 | 117 | 118 |
| Ball tack | | 8 | 9 | 7 | 10 | 9 | 11 |
| 90° peel creep Distance moved over 1 h or duration before falling | | | | | | | |
| 15 mm, 30 g | | 75 mm | 86 mm | 46 min | No slip | No slip | 68 mm |
| 15 mm, 50 g | | 28 min | 20 min | 19 min | 75 mm | 56 mm | 35 min |
| Hot-melt coatability | | A | A | A | A | A | A |

| | | Comparative Example 1 | Comparative Example 2 | Comparative Example 3 | Comparative Example 4 | Reference Example 5 | Reference Example 6 |
|---|---|---|---|---|---|---|---|
| Composition | Block copolymer (I-1) | | | | | | |
| | Block copolymer (I-2) | | | | | | |
| | Block copolymer (I-3) | | | | | | |

TABLE 2-continued

|  |  |  |  |  |  |  |
|---|---|---|---|---|---|---|
| Block copolymer (II-1) | 100 | 100 |  |  |  |  |
| Block copolymer (II-2) | 50 |  | 150 | 100 | 50 |  |
| Block copolymer (II-3) |  | 50 |  |  |  | 50 |
| Block copolymer (II-4) |  |  |  |  | 100 | 100 |
| Plasticizer: UR1000 |  |  |  | 50 |  |  |
| Adhesive force to SUS (N/25 mm) | 8.8 | 11.6 | 18.6 | 2.9 | 21.2 | 21.1 |
| Creep (distance moved: mm or duration before falling: min) | 0.2 mm | 0.2 mm | 0.0 mm | 0.1 mm | 768 min | 1.7 mm |
| SAFT (Temperature at falling: ° C.) | 108 | 118 | 147 | 114 | 101 | 107 |
| Ball tack | 9 | 9 | 3 | <3 | 4 | 5 |
| 90° peel creep Distance moved over 1 h or duration before falling |  |  |  |  |  |  |
| 15 mm, 30 g | 20 min | 55 min | No slip | 22 min | No slip | No slip |
| 15 mm, 50 g | 10 min | 24 min | No slip | 8 min | No slip | No slip |
| Hot-melt coatability | A | A | B | A | A | A |

TABLE 3

|  | Example 11 | Example 12 | Example 13 | Reference Example 7 |
|---|---|---|---|---|
| Composition Block copolymer (I-1) | 100 |  |  |  |
| Block copolymer (I-2) |  | 100 |  |  |
| Block copolymer (I-3) |  |  | 100 |  |
| Block copolymer (II-2) | 50 | 50 | 50 | 50 |
| Block copolymer (II-4) |  |  |  | 100 |
| Tackifying resin: KE311 | 30 | 30 | 30 | 30 |
| Adhesive force to SUS (N/25 mm) | 17.0 | 16.5 | 16.4 | 17.4 |
| Creep (duration before falling) | 580 min | 404 min | 65 min | 205 min |
| SAFT (Temperature at falling: ° C.) | 100 | 96 | 90 | 93 |
| Ball tack | 7 | 7 | 8 | 5 |
| 90° peel creep Distance moved over 1 h or duration before falling |  |  |  |  |
| 15 mm, 30 g | 50 mm | 54 mm | 77 mm | No slip |
| 15 mm, 50 g | 46 min | 38 min | 34 min | No slip |

Toluene solutions having a concentration of 30 mass % were prepared as shown in Table 4 and used to form sheets having a thickness of 1 mm by a solution casting method. These sheets were used to measure the melt viscosities of the adhesive compositions heated to a temperature ranging from 160° C. to 200° C. with a Brookfield viscometer. The spindle used was No. 29.

TABLE 4

|  | Example 6 | Comparative Example 1 | Comparative Example 4 |
|---|---|---|---|
| Composition (I-2) | 100 |  |  |
| (II-1) |  | 100 |  |
| (II-2) | 50 | 50 | 100 |
| UP1000 |  |  | 50 |
| Melt viscosity (mPa · s) |  |  |  |
| 160° C. | 41,300 | 49,000 | 84,000 |
| 180° C. | 12,500 | 14,000 | 13,800 |
| 200° C. | 5,900 | 6,000 | 3,600 |

As is clear from Table 2, Examples 5 to 10 in which the acrylic block copolymers (I) of Examples 1 to 4 having a structure of blocks (A)-(B)-(A) and a viscosity satisfying the range defined in the present invention were used had a high adhesive force and good heat-resistant adhesiveness, holding power, and tack; furthermore, they were excellent in 90° peel creep (90° holding power) and hot-melt coatability. In Comparative Example 1, the acrylic block, copolymer having no triblock structure was used instead of the acrylic block copolymer (I); in Comparative Example 4, the plasticizer was used in place of the acrylic block copolymer (I). From Table 4, Example 6 and Comparative Examples 1 and 4 each had an approximately similar degree of melt viscosity at 180° C.; in terms of hot-melt coatability, they had an approximately similar quality to Examples 5 to 7. Comparative Examples 1 and 4, however, had a small adhesive force; in the test of 90° peel creep, the falling occurred after a short period of time, and the results were below those in Examples 5 to 7. In Comparative Example 4, tack was very small, and adhesive performance was substantially not given.

In Comparative Example 2, the acrylic block copolymer having no triblock structure was used in place of the acrylic block copolymer (I) as in Comparative Example 1. Examples 8 to 10 and Comparative Example 2 had an approximately similar degree of hot-melt coatability. Comparative Example 2, however, had a small adhesive force; in the test of 90° peel creep, the falling occurred after a short period of time, and the results were below those in Examples 8 to 10. Comparative Example 3 in which only the acrylic triblock copolymer having a viscosity exceeding the range defined in the present invention was used was excellent in an adhesive force and holding power but had a bad hot-melt coatability brought about by such high viscosity. In Reference Examples 5 and 6, the block copolymer (II-4) was used. These Reference Examples had a high adhesiveness and were excellent in peel creep; in addition, they did not have such a big problem in hot-melt coatability as Comparative Example 3. In such Reference Examples, however, a heat-resistant adhesiveness, holding power, and tack were likely to be smaller than those 1B Examples 5 to 10. The block copolymer (II-4) had a higher melt viscosity at 100° C. than the block copolymers (I-1) to (I-4) of Examples 1 to 4, and thus the adhesive compositions containing the block copolymer (II-4) might have a problem in hot-melt processability, depending on the constitution thereof.

As is clear from Table 3, in the case where the adhesive composition of the present invention additionally contained a tackifying resin, the adhesive composition had a stronger adhesive force, was excellent in tack, and exhibited further enhanced 90° peel creep (90° holding power).

The invention claimed is:

1. An acrylic block copolymer (I), comprising:
a polymer block (A) comprising methacrylic acid ester units and
a polymer block (B) comprising acrylic acid ester units,
wherein the acrylic block copolymer (I) comprises a structure of blocks (A)-(B)-(A), a weight average molecular weight Mw of from 30,000 to 100,000, and a melt viscosity measured at 100° C. with a Brookfield viscometer of not more than 100,000 mPa·s.

2. The acrylic block copolymer (I) according to claim 1, wherein a total content of the polymer block (A) is not more than 15 mass %, and the acrylic block copolymer (I) has a molecular weight distribution Mw/Mn of 1.0 to 1.5.

3. The acrylic block copolymer (I) according to claim 1, wherein the acrylic acid ester units of the polymer block (B) is obtained from an acrylic acid ester represented by $CH_2=CH-COOR^1$, where $R^1$ represents an organic group having 1 to 10 carbon atoms.

4. The acrylic block copolymer (I) according to claim 1, which is a triblock copolymer.

5. The acrylic block copolymer (I) according to claim 1, which comprises, as the polymer block (A), a polymer block (A1) and polymer block (A2) having different weight average molecular weights.

6. The acrylic block copolymer (I) according to claim 5, wherein at least one of the polymer blocks (A1) and (A2) has a weight average molecular weight of not less than 300 and below 3,000.

7. An adhesive composition, comprising:
(i) acrylic block copolymer (I) according to claim 1; and
(ii) an acrylic block copolymer (II) comprising at least one polymer block (C) comprising methacrylic acid ester units and at least one polymer block (D) comprising acrylic acid ester units,
wherein the acrylic block copolymer (II) has a weight average molecular weight Mw of from 50,000 to 300,000 and has a melt viscosity measured at 100° C. with a Brookfield viscometer of greater than 100,000 mPa·s.

8. The adhesive composition according to claim 7, wherein a content of the acrylic block copolymer (II) is from 1 to 500 parts by mass relative to 100 parts by mass of the acrylic block copolymer (I).

9. The adhesive composition according to claim 7, wherein the acrylic acid ester of the polymer block (D) of the acrylic block copolymer (II) is the same as the acrylic acid ester of the polymer block (B) of the acrylic block copolymer (I).

10. The adhesive composition according to claim 7, further comprising a tackifying resin.

11. A hot-melt adhesive, comprising the adhesive composition according to claim 7.

12. An adhesive product, comprising an adhesive layer formed the adhesive composition according to claim 7.

13. The acrylic block copolymer (I) of claim 1, wherein the polymer block (A) consists of the methacrylic acid ester units and
the polymer block (B) consists of the acrylic acid ester units.

14. An acrylic block copolymer (I), comprising:
a polymer block (A) comprising methacrylic acid ester units and
a polymer block (B) comprising acrylic acid ester units,
wherein the acrylic block copolymer (I) comprises at least one structure of blocks (A)-(B)-(A), a weight average molecular weight Mw of from 30,000 to 100,000, and a melt viscosity measured at 100° C. with a Brookfield viscometer of not more than 100,000 mPa·s.

15. The acrylic block copolymer (I) according to claim 14, wherein the acrylic block copolymer (I) consists of the at least one structure blocks (A)-(B)-(A).

16. The acrylic block copolymer (I) according to claim 5, wherein at least one of the polymer blocks (A1) and (A2) has a weight average molecular weight of not less than 300 and less than 2,000.

17. The acrylic block copolymer (I) according to claim 1, wherein the acrylic block copolymer (I) consists of the structure blocks (A)-(B)-(A).

* * * * *